(No Model.)

J. MURRAY.
CAR COUPLING.

No. 300,885.   Patented June 24, 1884.

Witnesses:
Alf. Charbonneau
G. H. Harwood

Inventor.
Jas. Murray
By J. Boursolle
Atty.

UNITED STATES PATENT OFFICE.

JAMES MURRAY, OF NEWCASTLE, NEW BRUNSWICK, CANADA, ASSIGNOR OF ONE-HALF TO ALLAN RITCHIE AND JOHN ROBERT NICHOLSON, BOTH OF SAME PLACE.

CAR-COUPLING.

SPECIFICATION forming part of Letters Patent No. 300,885, dated June 24, 1884.

Application filed April 26, 1884. (No model.) Patented in Canada March 13, 1884, No. 18,866.

*To all whom it may concern:*

Be it known that I, JAMES MURRAY, of Newcastle, in the county of Northumberland, in the Province of New Brunswick, Canada, machinist, have invented certain new and useful Improvements in Car - Couplings; and I do hereby declare the following to be a full, clear, and exact description of the same.

My invention relates to devices for facilitating the manipulation of the couplings of railway-cars; and it consists in the peculiar construction and arrangement of the several parts, as hereinafter described, and shown in the annexed drawings, in which—

Figure 1:
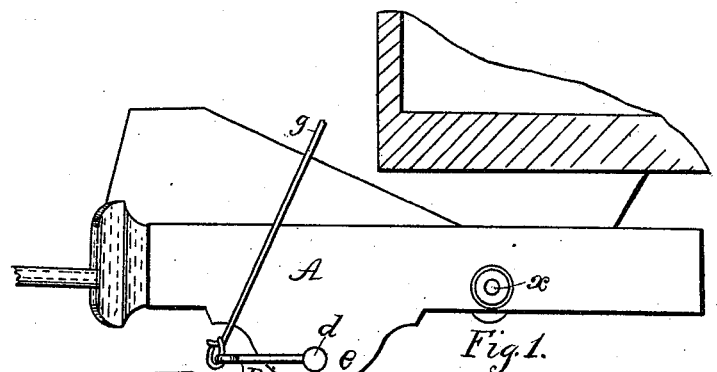
Figure 2:
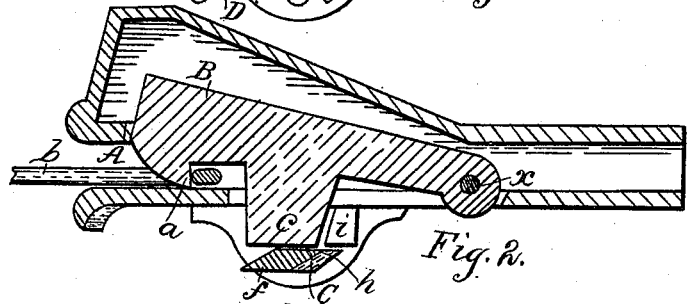
Figure 3:
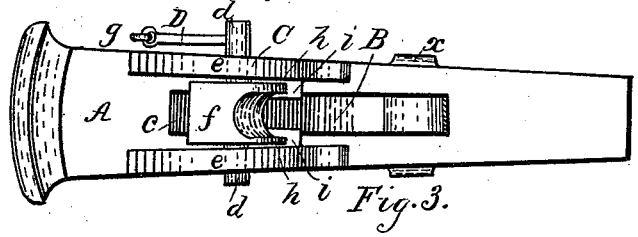
Figure 4:
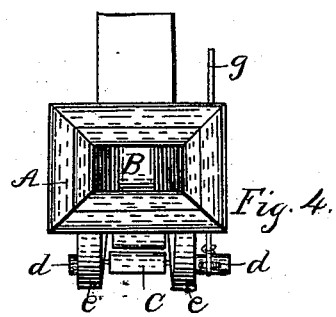

Figure 1 is a part section of a car, showing the coupling in elevation. Fig. 2 is a longitudinal section through the coupling. Fig. 3 is a view of the under side of the coupling, and Fig. 4 is an end or face view of the same.

A represents the draw-head, which is chambered, as shown, and has pivoted to it at $x$, near the inner end of said chamber, the pawl B. This pawl is provided with the hook $a$, formed on its under side and near its outer or movable end, and being pivoted at its inner end, as shown, its outer or hook end, when raised and then let go, will fall back by its own weight. The outer face of the hook $a$ is sloped upward and outward in order that the coupling-link $b$ may be easily shoved under it, the pawl rising to allow the link to pass under it and fall again as soon as the end of the link has passed the hook $b$. At a short distance in rear of the hook $b$, and also on the under side of the pawl, is formed or fixed the projecting block $c$, which extends out through an opening formed in the under side of the draw-head.

C is a rocking trip for raising the pawl B. It is provided with the journals $d\,d$, which rest in bearings in the lugs $e\,e$, which are formed on the under side of the draw-head. $f$ is a lifting-arm, being a portion of the rocking trip which extends out forward of its axis or pivotal center. This rocking trip is placed close to and immediately under the projecting block $c$, so that when the lifting-arm $f$ is turned upward it will raise the outer end of the pawl and allow the coupling-link $b$ to be withdrawn. One of the journals $d$ of the rocking trip is extended out beyond its bearing in the lug, so as to allow of the attachment thereto of the lifting-lever D, by which the rocking trip may be operated either from the top or inside of the car through the rope $g$, attached to it. A rod or chain may be used, if preferred, instead of the rope $g$.

$h\,h$ are two projecting toes, one on each side of the rocking trip, and pointing in an opposite direction from the lifting-arm $f$. These projecting toes, coming against the stops $i\,i$, which are formed on the inner sides of the lugs $e\,e$, prevent the lifting-arm dropping lower than is desirable. An enlargement of the chamber of the draw-head upward allows the pawl to be raised for uncoupling, while at the same time it is protected from the weather by the top of the chamber.

What I claim is—

1. In a railway-car coupler, the rocking trip C, supported on its journals $d\,d$ in the lugs $e\,e$, and provided with the lifting-arm $f$, the lifting-lever D, rod, rope, or chain $g$, and projecting toes $h\,h$, substantially as described.

2. In a railway-car coupler, the combination of the draw-head A, having the lugs $e\,e$ and the stops $i\,i$ fixed or formed thereon, with the rocking trip C, substantially as shown and described, and for the purpose set forth.

Signed at Newcastle, this 16th day of April, 1884.

JAMES MURRAY.

In presence of—
   WM. P. HARRIMAN,
   OSBURN NICHOLSON.